Aug. 7, 1962     C. A. CADY     3,048,763

BATTERY CHARGING APPARATUS

Filed Sept. 8, 1959

*INVENTOR.*
CHARLES A. CADY
BY
KENWAY, JENNEY, WITTER & HILDRETH

ATTORNEYS

United States Patent Office 3,048,763
Patented Aug. 7, 1962

3,048,763
BATTERY CHARGING APPARATUS
Charles A. Cady, 42 Shaw Drive, Wayland, Mass.
Filed Sept. 8, 1959, Ser. No. 838,626
6 Claims. (Cl. 320—39)

This invention relates in general to a new and improved battery charging control circuit, in particular to a voltage-sensitive control circuit whose control voltage is substantially free of ripples.

It is conventional practice in battery charging control circuits to use the voltage which appears across the battery terminals as a measure of the state of charge of the battery itself, under specified conditions of charging current rate and ambient temperature. A voltage-sensitive device connected across the battery terminals controls the battery charging process. Where the available power source is an ordinary 60-cycle line, a transformer-rectifier combination is customarily employed to obtain a D.C. charging current. The charging current so obtained generally includes ripple frequency components which are superimposed on the D.C. These ripple frequency components are dependent on the input A.C. frequency as well as on the nature of the A.C. power supply, i.e., single phase, three phase, etc. They are further dependent on the particular rectifier configuration employed, i.e., half-wave, full-wave, etc.

Since the ripple components do not interfere with the normal battery charging process, no attempt is ordinarily made to filter them out by employing conventional R-C or L-C network filters. In view of the low ripple frequencies (120 c.p.s. and up), the use of such filters would inordinately increase the cost of the control circuit. However, where the D.C. terminal voltage of the battery is used as the control voltage to govern the battery charging process, the ripple components, which may constitute an appreciable portion of the total D.C. voltage to which the voltage-sensitive device responds, may produce an erroneous response of the latter.

The invention which forms the subject matter of this application provides a control circuit which is substantially independent of ripple frequency components. In place of employing an expensive filter network, this is accomplished in a bridge circuit wherein the battery which is to be charged is connected as one arm thereof. The rippled D.C. voltage is applied across the bridge arm which contains the battery and an adjacent resistive arm connected in series therewith. Oppositely phased ripple components are produced in the two arms. By the proper selection of the impedances of the remaining two arms of the bridge, the oppositely phased ripple frequency components can be substantially nulled out so that a ripple-free voltage appears across two of the bridge terminals.

It is accordingly the primary object of this invention to provide a battery charging control circuit wherein the control voltage which is applied to the voltage-responsive device is representative of the D.C. battery terminal voltage only.

This and other objects of the invention together with further features and advantages thereof will become apparent from the following specification in conjunction with the accompanying drawings, in which.

Figures 1, 3:
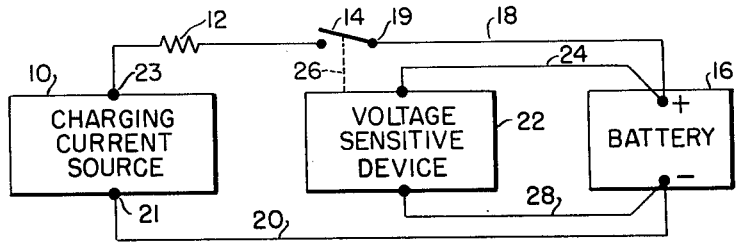
FIG. 1 illustrates schematically a battery charging control circuit.
FIG. 3 illustrates a preferred embodiment of this invention.

With reference now to the drawings, a battery charging control circuit is shown schematically in FIG. 1. A source of charging current 10 is connected in series with a current limiting impedance 12 which is connected to one terminal of a switch 14. The other switch terminal is connected to the positive terminal of a battery 16 by means of a conductor 18. A conductor 20 connects the source of charging current 10 to the negative battery terminal. A voltage-sensitive device 22 is also connected across the battery terminals by means of conductors 24 and 28 respectively. The switch 14 is operated from the voltage-sensitive device 22 by means of a mechanical connection 26. In operation, when the battery has charged to a point where a predetermined voltage which is representative of a fully charged battery condition appears between the battery terminals, the voltage-sensitive device causes the switch 14 to open and to interrupt the flow of charging current to the battery.

It will be noted from FIG. 1, that the voltage-sensitive device 22 is connected to the battery terminals by means of a pair of separate leads 24 and 28. In existing apparatus it is customary to connect the leads 24 and 28 to any convenient point in the circuit which is common to the positive and negative battery terminals. Since the source of charging current 10 and the voltage-sensitive device 22 are frequently located in a common case remote from the battery 16, the leads 18 and 20 are necessarily of such length as to constitute an appreciable impedance. Under these conditions, the charging current may produce a substantial voltage drop in the leads 18 and 20. If the voltage-sensitive device 22 were to be connected between the terminals 21 and 23, or between the terminals 21 and 19, its response would not be governed by the battery terminal voltage alone, but would include the impedance of the leads. The voltage drop occurring in the leads 18 and 20, under these conditions, includes both the D.C. component of the charging current as well as the ripple component. Any change in the amplitude of the ripple component, therefore, affects the voltage-sensitive device 22. Moreover, any change in the ambient temperature, or in the length of the leads used, will affect the total impedance of the leads 18 and 20 and produce a change in the voltage drop.

For the foregoing reasons it is preferable to isolate the source of charging current 10 from the voltage-sensitive device 22 by using separate leads to connect the latter directly to the positive and negative battery terminals. The leads 24 and 28 which are used for this purpose in the circuit of FIG. 1 need only be large enough to carry the relatively small current required to operate the voltage-sensitive device 22. The leads 18 and 20, however, must be large enough to carry the required battery charging current. With this arrangement, no common impedance other than the battery itself, exists between the source of charging current 10 and the voltage-sensitive device 22. Accordingly, errors of the kind discussed above cannot occur.

Figure 2A:
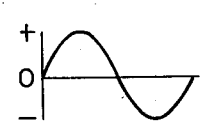
FIGS. 2a, 2b and 2c illustrate the voltage wave forms which occur at various points in the circiut of FIG. 1.
Figure 2B:
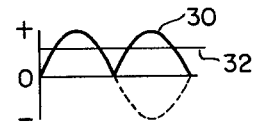
Figure 2C:
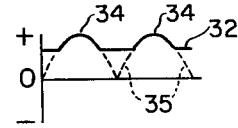

As previously pointed out, the power source is frequently a 60-cycle A.C. line and a transformer-rectifier combination is used to obtain D.C. FIG. 2 illustrates the voltage wave forms which are present in the circuit of FIG. 1, where the source of charging current 10 consists of a single-phase, line-coupled transformer having a full-wave rectifier connected across the transformer secondary. FIG. 2a shows the A.C. voltage wave form of the line voltage. The wave form 30 of FIG. 2b is representative of the output wave form of a conventional single-phase, full-wave rectifier while the line 32 represents the D.C. voltage which appears across the battery terminals in the absence of any charging current. FIG. 2c represents the resultant wave form of the voltage which appears across the battery terminals. This is seen to consist of the D.C. battery voltage 32 which has ripple peaks 34 superimposed thereon. This wave form results from the operation of the circuit of FIG. 1. Whenever the amplitude of the full-wave rectified voltage falls below that of the D.C. battery voltage represented by the line 32, the back E.M.F. of the battery produces a current flow and prevents the voltage across the battery terminals from falling any lower and following the dotted-line portion 35. The effect is one of smoothing out the voltage wave form between successive ripple peaks 34. Despite this smoothing action, a true D.C. condition does not exist.

Under certain conditions, the ripple peaks 34 constitute an appreciable portion of the total voltage which appears across the battery terminals and which is available to operate the voltage-sensitive device 22 in FIG. 1. Moreover, any change in the amplitude of the ripple components, e.g., due to a variation in the line voltage, may result in a corresponding undesired change in the operating point of the voltage-sensitive device 22. Under these conditions, the operation of the voltage-sensitive device, and hence the battery charging operation, becomes unreliable since it is subject to spurious influences and is governed by conditions external to the battery itself. In order to have a proper and reliable battery charging operation, the voltage-sensitive device must respond to the D.C. component only of the battery terminal voltage.

FIG. 3 illustrates a preferred embodiment of the invention wherein the aforesaid condition is obtained. The primary winding 36 of a transformer 38 is connected across an A.C. line. The transfomer secondary terminals 40 and 42 are connected to a pair of oppositely poled diode rectifiers 49 and 46 respectively which are tied to a common junction junction point 48 to constitute a full-wave rectifier. The transformer secondary has a center tap 50 which is connected to a terminal 52 of a bridge circuit 54. The battery 56 which is to be charged by the charging current forms one arm of the bridge circuit and is connected between a pair of terminals 58 and 60 by means of a pair of leads 86 and 84 respectively. A current limiting resistor 62 forms a second bridge arm and is connected between the bridge terminals 60 and 52. A pair of balancing resistors 64 and 66 is connected between a fourth bridge terminal 68 and the bridge terminals 52 and 58 respectively. The resistance value of the resistor 64 is large with respect to the resistor 66. In a preferred embodiment, the ratio of these resistance values is approximately equal to the ratio of the ripple voltages appearing across the resistor 62 and to that appearing across the battery 56. A voltage-sensitive device 70, e.g., a relay, is connected between the bridge terminals 60 and 68. A mechanical connection 72 which is operated by the device 70 is adapted to actuate a battery charging control switch 74 which is connected between the bridge terminal 58 and the common junction point 48. If desired, the switch 74 may be shunted by a resistor 76 which is adapted to supply a trickle charge to the battery. The trickle charge may be large enough to compensate for losses in the resistive bridge network which represents a load on the battery at all times. A condenser 78 may, if desired, be connected in series with the resistor 64, as will hereinafter be explained in greater detail.

Figure 4A:
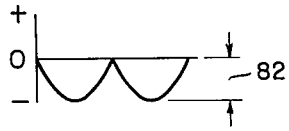
FIGS. 4a, 4b and 4c illustrate the voltage wave forms which occur at various points in the circuit of FIG. 3.
Figure 4B:
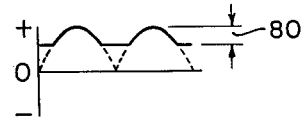
Figure 4C:
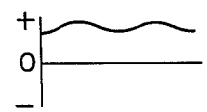

The operation of the circuit of FIG. 3 will be explained with reference to FIG. 4 which illustrates the voltage wave forms that appear at certain points of the bridge circuit with reference to the bridge terminal 60. Thus, FIG. 4a shows the voltage wave form which appears at the bridge terminal 52, FIG. 4b illustrates the voltage wave form appearing at the bridge terminal 58 and FIG. 4c illustrates the voltage wave form which appears at the bridge terminal 68. The voltage wave form appearing between the terminals 40 and 42 of the secondary winding of the transformer 38, which is not represented in FIG. 4, is equivalent to that of the A.C. wave form illustrated in FIG. 2a above. Similarly, the voltage wave form 30 which is illustrated in FIG. 2b above is representative of the voltage which appears between the center tap 50 and the common junction point 48 of the circuit of FIG. 3. The voltage wave form which appears across the battery 56, i.e., at the bridge terminal 58 with respect to the terminal 60, is illustrated in FIG. 4b. This voltage wave form is seen to be equivalent to that illustrated in FIG. 2c in connection with the conventional battery charging control circuit of FIG. 1. As explained in connection with FIG. 1, the presence of the D.C. battery voltage reduces the amplitude of the ripple to that which appears above the D.C. battery voltage level. This ripple amplitude is indicated by the reference numeral 80 in FIG. 4b. On the other hand, the amplitude 82 in FIG. 4a of the ripple component of the voltage wave form which appears across the resistor 62, i.e., the voltage on the bridge terminal 52 with respect to the terminal 60, is seen to be considerably larger since no back E.M.F. is available to fill in the valleys between successive peaks. In actual practice, the voltage wave form does not return entirely to zero between successive peaks because of the inherent reactive impedance associated with the resistor 62. The peak ripple amplitude 82, however, is much greater than the peak ripple amplitude 80 illustrated in FIG. 4b. Additionally, the ripple voltage illustrated in FIG. 4a is 180° out of phase with that of FIG. 4b. Accordingly, it may be used to cancel the ripple voltage which appears on terminal 58. This is accomplished by letting the resistor 64 have a resistance value which is much larger than that of resistor 66 and which is preferably proportional therewith in the same ratio as the relative ripple voltages appearing on the bridge terminals 52 and 58 respectively. With this circuit arrangement, the ripple voltage which appears on the bridge terminal 68 is practically reduced to zero, as illustrated in FIG. 4c. The voltage which is thus applied to the voltage-sensitive device 70 is therefore substantially ripple-free and is, for all practical purposes, representative only of the D.C. voltage which appears across the battery terminals.

In order for the voltage-sensitive device 70 to respond as closely as possible to the D.C. battery voltage which appears between the terminals 58 and 60, the resistance value of the resistor 66 must be small compared to the internal resistance of the voltage-sensitive device. Since the resistor 66 must also be small relative to the resistor 64, this requirement is readily complied with.

The purpose of the arrangement illustrated in FIG. 3 is to reduce the ripple voltage which appears between the terminals 68 and 60. Accordingly, the function of the resistor 64 may be restricted to that of passing A.C. current only by connecting a condenser 78 in series therewith. Since D.C. current is now blocked from flowing through this bridge arm, it is possible to calculate the influence of the resistor 66 upon the sensitivity of the device 70 entirely from D.C. considerations. The point of which the device 70 causes the switch 74 to open may be adjusted accordingly.

In order to obviate the difficulties which arise from the use of long leads, as explained in connection with the circuit of FIG. 1, the battery leads 84 and 86 are preferably kept short. Alternatively, these leads are omitted and the positive and negative battery terminals become identical with the bridge terminals 58 and 60 respectively.

The apparatus illustrated in FIG. 3 was built and was successfully operated to obtain a ripple reduction of 10:1. The following resistor values were used:

Internal resistance of the voltage-sensitive device 70=90 ohms
Resistor 66=2 ohms ±10%
Resistor 64=150 ohms ±10%
Resistor 62=0.5 ohms Considerable leeway is, of course, possible in choosing the individual components of the preferred embodiment of the invention which is illustrated in FIG. 3. Thus, the voltage-sensitive device 70 may constitute any relay of the common thermal, magnetic, or piezo electric switch type. It may also consist of a system which employs magnetic amplifiers, Zener diodes or switching transistors and the like. In the latter case, the switch 74 itself may be replaced by a switching diode whose conductivity is controlled by the voltage-sensitive device 70.

From the foregoing disclosure it will be apparent that numerous modifications, variations, and substitutions may now occur to those skilled in the art all of which fall within the true spirit and scope of this invention.

I claim:

1. A voltage control circuit for regulating the application of a charging current to a battery comprising, a source including a transformer having a primary winding adapted to be energized from an A.C. supply, said transformer further including a secondary winding having a pair of terminals and a center tap disposed therebetween, a pair of oppositely poled diode rectifiers connected between a common junction point and respective ones of said transformer secondary terminals, a bridge circuit including four bridge terminals, means for connecting said battery between first and second ones of said bridge terminals, a current limiting resistor connected between first and third ones of said bridge terminals, first and second balancing resistors connected between second and fourth bridge terminals and third and fourth bridge terminals respectively, the resistance of said first balancing resistor being relatively small with respect to that of said second balancing resistor, means for connecting said third bridge terminal to said center tap, a charging control switch connected between said common junction point and said second battery terminal, and means responsive only to the voltage between said first and fourth terminals for opening said switch when said voltage is above a predetermined value.

2. The apparatus of claim 1 wherein the negative and positive terminals of said storage battery are respectively identical with said first and second bridge terminals.

3. The apparatus of claim 2 wherein the ratio of the resistance values of said first to said second balancing resistor is equal to the ratio of the ripple voltage appearing across said first and second bridge terminals to that appearing across said first and third bridge terminals.

4. The apparatus of claim 2 and further comprising a condenser connected in series with said second balancing resistor.

5. The apparatus of claim 2 and further comprising a by-pass resistor connected in parallel with said charging control switch, said by-pass resistor being adapted to supply a trickle charge to said battery when said charging switch is open.

6. A voltage control circuit for regulating the application of a charging current to a battery comprising, a bridge circuit including four bridge terminals, means for connecting said battery between first and second ones of said bridge terminals, a current limiting resistor connected between first and third ones of said bridge terminals, first and second balancing resistors connected between second and fourth bridge terminals and third and fourth bridge terminals respectively, the resistance of said first balancing resistor being relatively small with respect to that of said second balancing resistor, a charging control switch and a source of D.C. voltage having a ripple voltage component connected in series between said second and third terminals, and means responsive only to the voltage between said first and fourth terminals for opening said switch when said voltage is above a predetermined value.

References Cited in the file of this patent

UNITED STATES PATENTS 2,713,659   Johnson _____ July 19, 1955